United States Patent [19]

Ohmi et al.

[11] Patent Number: 5,520,492

[45] Date of Patent: May 28, 1996

[54] SLIDING PARTS AND METHOD OF PRODUCING SAME

[75] Inventors: Tadahiro Ohmi, Sendai; Nobukazu Ikeda, Osaka; Michio Yamaji, Osaka; Tsutomu Shinohara, Osaka; Akihiro Morimoto, Osaka, all of Japan

[73] Assignee: Fujikin Incorporated, Osaka, Japan

[21] Appl. No.: 365,452

[22] Filed: Dec. 28, 1994

[30] Foreign Application Priority Data

Dec. 28, 1993 [JP] Japan ................................ 5-333947

[51] Int. Cl.⁶ ............................................ F16B 37/00
[52] U.S. Cl. ...................... 411/427; 411/900; 411/901; 285/386; 285/390; 285/422; 427/372.2; 427/383.1; 384/95; 384/912
[58] Field of Search ........................... 285/386, 390, 285/422, 354, 39; 411/900, 901, 902; 427/372.2, 383.1, 125; 384/95, 91 L

[56] References Cited

U.S. PATENT DOCUMENTS

| | | | |
|---|---|---|---|
| 4,974,972 | 12/1990 | Boosler et al. | 384/572 X |
| 5,060,987 | 10/1991 | Miller | 285/354 X |
| 5,165,832 | 11/1992 | Dimor | 411/902 X |
| 5,188,398 | 2/1993 | Parimore et al. | 285/39 |
| 5,350,205 | 9/1994 | Aldridge et al. | 285/354 X |
| 5,352,656 | 10/1994 | Lackey et al. | 427/125 X |

*Primary Examiner*—Dave W. Arola
*Attorney, Agent, or Firm*—Armstrong, Westerman, Hattori, McLeland & Naughton

[57] ABSTRACT

A sliding part having a metallic main body which is formed with a silver plating layer over a surface thereof slidable in contact with other metallic part. The silver plating layer has a crystal structure so adapted that the intensity of diffraction X-rays diffracted by the (200) plane thereof is at least ⅓ of the intensity of diffraction X-rays diffracted by the (111) plane.

10 Claims, No Drawings

SLIDING PARTS AND METHOD OF PRODUCING SAME

BACKGROUND OF THE INVENTION

The present invention relates to sliding parts, for example, for use as threaded parts which are screwed on each other, such as union nuts and union screws for screw pipe joints, sliding bearings and shafts to be thereby supported, and two plates Which are slidable on each other.

For example, the union nut and union screw for use in screw pipe joints are so adapted that when these components are screwed on each other, the opposed flanks slide on each other. The union nut conventionally used is formed with a silver plating layer over the surface of its threaded portion in order to prevent scoring or seizure that would occur when it is tightened up.

However, it has been found that the conventional union nut encounters the following problems. If the union nut is repeatedly tightened up on the union screw and unfastened therefrom as when the screw pipe joint is repeatedly installed and removed, the frictional resistance between the sliding faces of the nut and the screw increases, consequently necessitating a gradually increasing torque for tightening up. This entails the problem that a specified tightening axial tension becomes unavailable by controlling the axial tension with the tightening torque. Another problem then arises in that the nut requires an increased torque for unfastening, rendering the pipe joint difficult to remove.

Accordingly, we have conducted various experiments and research to ascertain the cause of the above problems and consequently found that the occurrence of these problems is closely associated with the crystal structure of the silver plating layer, especially with the relationship between the intensity of X-rays diffracted by the (111) plane thereof and the intensity of X-rays diffracted by the (200) plane. When the intensity of X-rays diffracted by the (111) plane of the silver plating layer is taken as 100, the intensity of X-rays diffracted by the (200) plane is less than 30 in the case of the conventional union nut. We have found that this results in the foregoing problems.

SUMMARY OF THE INVENTION

An object of the present invention is to provide a sliding part which is repeatedly slidable with an increase in the frictional resistance between the sliding faces prevented and which is capable of retaining its sliding characteristics over a prolonged period of time, and to provide a method of producing the sliding part.

Other objects of the present invention will become apparent from the following description.

The present invention provides a sliding part having a metallic main body, the main body being formed with a silver plating layer over a surface thereof slidable in contact with other metallic part, the silver plating layer having a crystal structure so adapted that the intensity of diffraction X-rays diffracted by the (200) plane thereof is at least 1/3 of the intensity of diffraction X-rays diffracted by the (111) plane.

The sliding part of the invention is repeatedly slidable without an increase in frictional resistance and therefore retains its sliding characteristics over a prolonged period of time.

The present invention also provides a method of producing a sliding part having a metallic main body, the method being characterized by forming a silver plating layer on the main body over a surface thereof slidable in contact with other metallic part, and thereafter heating the main body at 400° to 550° C. for 2 to 7 hours, whereby the intensity of diffraction X-rays diffracted by the (200) plane of the silver plating layer is made at least 1/3 of the intensity of diffraction X-rays diffracted by the (111) plane.

The production method of the present invention affords sliding parts having the advantage described above,

DESCRIPTION OF THE PREFERRED EMBODIMENTS

The silver plating layer formed on the metallic main body of the sliding part embodying the invention has a crystal structure which is so limited that the intensity of diffraction X-rays diffracted by the (200) plane thereof is at least 1/3 of the intensity of diffraction X-rays diffracted by the (111) plane because if the former intensity is less than 1/3 of the latter, repeated sliding results in increased frictional resistance. For example, when the union nut is repeatedly tightened up, the frictional resistance increases to necessitate an increased torque for tightening and unfastening.

The intensity of diffraction X-rays diffracted by the (200) plane is preferably at least 1/2 of the intensity of diffraction X-rays diffracted by the (111) plane.

Preferably, the thickness of the silver plating layer is 0.5 to 20 µm for the following reason. Although it is desired that the silver plating layer be thinner from the viewpoint of cost, too small a thickness lowers the durability of the layer to eliminate the effect when sliding is repeated several times. The thickness of the siliver plating layer is preferably greater to give improved durability to the layer and enable the layer to retain its effect even if sliding is repeated an increased number of times, whereas as the thickness of the layer increases, it becomes difficult for the layer to follow the deformation of the metallic main body of the part, with the likelihood of the plating layer separating off upon cracking. Moreover, the silver plating layer has low mechanical strength, so that if the layer is excessively thick, the sliding part fails to exploit the mechanical strength of the base metal and is likely to exhibit impaired mechanical strength. Thus, giving an excessive thickness to the layer involves problems. It is therefore desired that the thickness of the plating layer be within the above range.

The metallic main body can be a union nut and/or union screw for use in a screw pipe joint. The metallic main body can be a sliding bearing and/or shaft thereby supportable. The metallic main body can further be at least one of two plates slidable on each other.

With the method of producing the sliding part of the invention, the heating temperature is 400° to 550° C., and the heating time is 2 to 7 hours because if these conditions are outside the respective ranges, the sliding part prepared fails to fulfill the requirement that the intensity of diffraction X-rays diffracted by the (200) plane of the silver plating layer of the part should be at least 1/3 of the intensity of diffraction X-rays diffracted by the (111) plane. The heating temperature is preferably 450° to 550° C. The heating time is preferably 2 to 4 hours.

The silver plating layer is preferably 0.5 to 20 µm in thickness for the following reason. Although it is desired that the silver plating layer be thinner from the viewpoint of cost, too small a thickness lowers the durability of the layer to eliminate the effect when sliding is repeated several times. The thickness of the silver plating layer is preferably greater to give improved durability to the layer and enable the layer to retain its effect even if sliding is repeated an increased number of times, whereas with an increase in the thickness of the layer, it becomes difficult for the layer to follow the deformation of the metallic main body of the part, with the likelihood of the plating layer separating off upon cracking. Moreover, the silver plating layer has low mechanical strength, so that if the layer is excessively thick, the sliding part fails to exploit the mechanical strength of the base metal and is likely to exhibit impaired mechanical strength. Thus, giving an excessive thickness to the layer involves problems. It is therefore desired that the thickness of the plating layer be within the above range.

The foregoing method affords a sliding part having a metallic main body which is formed with a silver plating layer over .a surface thereof slidable in contact with other metallic part, the silver plating layer having a crystal structure so adapted that the intensity of diffraction X-rays diffracted by the (200) plane thereof is at least ⅓ of the intensity of diffraction X-rays diffracted by the (111) plane. However, this method is not limitative.

EXAMPLE 1

A silver plating layer, 20 μm in thickness, was formed on a union nut of stainless steel over the surface of its threaded portion, and the nut was thereafter heated at 400° C. for 6 hours. The intensity of diffraction X-rays diffracted by the (200) plane of the silver plating layer was 66 in the case where the intensity of diffraction X-rays diffracted by the (111).plane was taken as 100.

EXAMPLE 2

A silver plating layer, 20 μm in thickness, was formed on a union nut of stainless steel over the surface of its threaded portion, and the nut was thereafter heated at 550° C. for 6 hours. The intensity of diffraction X-rays diffracted by the (200) plane of the silver plating layer was 67 in the case where the intensity of diffraction X-rays diffracted by the (111) plane was taken as 100.

EXAMPLE 3

A silver plating layer, 20 μm in thickness, was formed on a union nut of stainless steel over the surface of its threaded portion, and the nut was thereafter heated at 550° C. for 2 hours. The intensity of diffraction X-rays diffracted by the (200) plane of the silver plating layer was 40 in the case where the intensity of diffraction X-rays diffracted by the (111) plane was taken as 100.

COMPARATIVE EXAMPLE 1

A silver plating layer, 20 μm in thickness, was formed on a union nut of stainless steel over the surface of its threaded portion, and the nut was thereafter heated at 200° C. for 6 hours. The intensity of diffraction X-rays diffracted by the (200) plane of the silver plating layer was 25 in the case where the intensity of diffraction X-rays diffracted by the (111) plane was taken as 100.

COMPARATIVE EXAMPLE 2

A silver plating layer, 20 μm in thickness, was formed on a union nut of stainless steel over the surface of its threaded portion. The intensity of diffraction X-rays diffracted by the (200) plane of the silver plating layer was 4 in the case where the intensity of diffraction X-rays diffracted by the (111) plane was taken as 100.

Evaluation Test

The union nuts of Examples 1 to 3 and Comparative Examples 1 and 2, and union screws of stainless steel were used. The nut was tightened up on the screw and then unfastened as a single procedure, and this procedure was repeated 10 times. A comparison was then made between the torque required for the first tightening and the torque required for the tenth tightening. As a result, almost no difference was found between the two torques in the case of Examples 1 to 3, whereas with Comparative Examples 1 and 2, the 10th tightening required 1.5 times the torque needed for the first tightening.

A further comparison was made between the torque required for the first unfastening and the torque required for the tenth unfastening. As a result, almost no difference was found between the two torques in the case of Examples 1 to 3, whereas with Comparative Examples 1 and 2, the tenth unfastening required 1.5 times the torque needed for the first unfastening.

These results indicate that Examples 1 to 3 make it possible to control the tightening axial tension with the tightening torque to obtain a specified axial tension at all times with an increase in the unfastening torque precluded even when the nut is repeatedly tightened up and unfastened.

What is claimed is:

1. A sliding part having a metallic main body, the main body being formed with a silver plating layer over a surface thereof slidable in contact with other metallic part, the silver plating layer having a crystal structure so comprised that the intensity of diffraction X-rays diffracted by the (200) plane thereof is at least ⅓ of the intensity of diffraction X-rays diffracted by the (111) plane.

2. A sliding part as defined in claim 1 wherein the intensity of diffraction X-rays diffracted by the (200) plane of the silver plating layer is at least ½ of the intensity of diffraction X-rays diffracted by the (111) plane.

3. A sliding part as defined in claim 1 wherein the silver plating layer is 0.5 to 20 μm in thickness.

4. A sliding part as defined in claim 1 wherein the metallic main body is at least one of a union nut union for use in a screw pipe joint.

5. A sliding part as defined in claim 1 wherein the metallic main body is at least one of a sliding bearing or shaft supportable thereby.

6. A sliding part as defined in claim 1 wherein the metallic main body is at least one of two plates slidable on each other.

7. A method of producing a sliding part having a metallic main body, characterized by forming a silver plating layer on the main body over a surface thereof slidable in contact with other metallic part, and thereafter heating the main body at 400° to 550° C. for 2 to 7 hours, whereby the intensity of diffraction X-rays diffracted by the (200) plane of the silver plating layer is made at least ⅓ of the intensity of diffraction X-rays diffracted by the (111) plane.

8. A method of producing a sliding part as defined in claim 7 wherein the silver plating layer is 0.5 to 20 μm in thickness.

9. A method of producing a sliding part as defined in claim 7 wherein the heating temperature is 450° to 550° C.

10. A method of producing a sliding part as defined in claim 7 wherein the heating time is 2 to 4 hours.

\* \* \* \* \*